US011787390B2

(12) United States Patent
Leone et al.

(10) Patent No.: US 11,787,390 B2
(45) Date of Patent: Oct. 17, 2023

(54) METHODS AND SYSTEMS FOR CONTROLLING ENGINE IDLE-STOP

(71) Applicant: Ford Global Technologies, LLC, Dearborn, MI (US)

(72) Inventors: Thomas G. Leone, Ypsilanti, MI (US); Alexander O'Connor Gibson, Ann Arbor, MI (US); Kenneth James Miller, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 912 days.

(21) Appl. No.: 16/460,163

(22) Filed: Jul. 2, 2019

(65) Prior Publication Data

US 2019/0322268 A1   Oct. 24, 2019

Related U.S. Application Data

(62) Division of application No. 15/698,548, filed on Sep. 7, 2017, now Pat. No. 10,392,002.

(51) Int. Cl.
*B60W 20/12* (2016.01)
*B60W 10/06* (2006.01)
(Continued)

(52) U.S. Cl.
CPC ............ *B60W 20/12* (2016.01); *B60W 10/06* (2013.01); *B60W 30/18018* (2013.01); *F02D 29/02* (2013.01); *F02D 37/02* (2013.01); *F02D 41/029* (2013.01); *F02D 41/065* (2013.01); *F02D 41/26* (2013.01); *F02D 41/3005* (2013.01); *F02N 11/0837* (2013.01); *B60W 2510/244* (2013.01); *B60W 2510/305* (2013.01); *B60W 2554/00* (2020.02); *B60W 2556/50* (2020.02); *B60W 2556/65* (2020.02); *B60W 2710/0616* (2013.01); *B60W 2710/244* (2013.01); *B60W 2710/305* (2013.01); *F02D 2200/70* (2013.01); *F02N 2200/026* (2013.01); *F02N 2200/101* (2013.01);
(Continued)

(58) Field of Classification Search
None
See application file for complete search history.

(56) References Cited

U.S. PATENT DOCUMENTS 9,440,654 B2   9/2016   Atluri et al.
9,604,635 B1 *  3/2017   Johri .................... B60W 10/06
(Continued)

FOREIGN PATENT DOCUMENTS

JP   2015018396 A  *  1/2015
JP   2015018396 A     1/2015

*Primary Examiner* — Aniss Chad
*Assistant Examiner* — Mahmoud M Kazimi
(74) *Attorney, Agent, or Firm* — Vincent Mastrogiacomo; McCoy Russell LLP

(57) ABSTRACT

Methods and systems are provided for controlling an engine idle-stop based on upcoming traffic and road conditions. In one example, a method may include receiving data including traffic information and road characteristics immediately ahead of a vehicle from one or more remote sources, and adjusting one or more vehicle thresholds based on the received data. A duration of a prospective engine idle-stop may be estimated based on the received data and an engine idle-stop may be initiated based on the duration of the prospective engine idle-stop and the adjusted one or more vehicle threshold.

13 Claims, 6 Drawing Sheets

(51) Int. Cl.

| | | |
|---|---|---|
| *B60W 30/18* | (2012.01) | |
| *F02D 29/02* | (2006.01) | |
| *F02D 37/02* | (2006.01) | |
| *F02D 41/02* | (2006.01) | |
| *F02D 41/26* | (2006.01) | |
| *F02D 41/30* | (2006.01) | |
| *F02N 11/08* | (2006.01) | |
| *F02D 41/06* | (2006.01) | |

(52) U.S. Cl.
CPC .. *F02N 2200/124* (2013.01); *F02N 2200/125* (2013.01)

(56) References Cited

U.S. PATENT DOCUMENTS

| | | |
|---|---|---|
| 2012/0330536 A1* | 12/2012 | Rollinger .............. F02D 41/008 701/111 |
| 2013/0124066 A1 | 5/2013 | Pebley et al. |
| 2015/0175149 A1 | 6/2015 | Zhao et al. |
| 2015/0258984 A1* | 9/2015 | Atluri ................. B60W 30/188 180/65.265 |
| 2016/0244044 A1 | 8/2016 | Miller et al. |
| 2016/0363060 A1 | 12/2016 | Shinohara et al. |
| 2017/0021824 A1 | 1/2017 | Johri et al. |
| 2018/0025630 A1 | 1/2018 | Matsumoto et al. |

\* cited by examiner

METHODS AND SYSTEMS FOR CONTROLLING ENGINE IDLE-STOP

CROSS REFERENCE TO RELATED APPLICATION

The present application is a divisional of U.S. Non-Provisional patent application Ser. No. 15/698,548, entitled "METHODS AND SYSTEMS FOR CONTROLLING ENGINE IDLE-STOP," and filed on Sep. 7, 2017. The entire contents of the above-referenced application are hereby incorporated by reference for all purposes.

FIELD

The present description relates generally to methods and systems for controlling an engine idle-stop based on upcoming traffic and road conditions.

BACKGROUND/SUMMARY

During intermediate vehicle stops such as at a traffic light, an engine may idle for some time. In order to increase fuel efficiency and improve emissions quality, the vehicle engine may be equipped with a start-stop function to reduce prolonged idling by temporarily shutting down the engine and then restarting the engine when restart conditions are met. Entry conditions for engine idle-stops may be determined based on current vehicle and engine operating conditions.

Various approaches are provided for scheduling an engine idle-stop. In one example, as shown in U.S. Pat. No. 9,440,654, Atluri et al. teaches a method to determine entry and exit conditions for engine idle-stops based on short-term and long-term look ahead data obtained from on-board vehicle sensors and external sources such as a network cloud. Short-term and long-term look ahead data indicate conditions likely to occur in the future, with long-term look ahead vehicle operating conditions being further in the future than short-term look ahead vehicle operating conditions.

However, the inventors herein have recognized potential issues with such systems. As one example, even though scheduling engine idle-stops may be beneficial for fuel efficiency and emissions quality, engine idle-stops for shorter durations may adversely affect engine performance and fuel efficiency. Repeated engine idle-stops that are shorter than a threshold duration may cause degradation of engine components. During engine restart immediately following an idle-stop for a shorter than threshold duration, a higher amount of energy may be used during engine cranking relative to the amount of energy saved by reducing fuel consumption, thereby affecting overall fuel efficiency. Also, frequent engine idle-stops may cause a series of perceivable changes in engine sound which may be objectionable to a vehicle operator.

In one example, the issues described above may be addressed by a method comprising: receiving data indicative of external vehicle conditions to a vehicle including a length of a line of vehicles and relative movement within the line, adjusting vehicle operating thresholds responsive to the data, and selectively activating or deactivating an engine responsive to the thresholds and the data. In this way, by adjusting vehicle operating thresholds for engine idle-stop based on upcoming traffic and road information as received from remote sources, engine idle-stops for a shorter than threshold duration may be reduced.

As one example, traffic information including length of a line of vehicles stopping in a road ahead of the vehicle and relative motion between individual vehicles in the line of vehicles may be obtained from remote sources. The on-board controller of the vehicle may be communicatively coupled to on-board controllers of one or more vehicles in the line of vehicles, such as using vehicle to vehicle (V2V) communication technology. The controller on-board the vehicle may also be wirelessly coupled to external networks and/or traffic sensors, such as using vehicle to infrastructure (V2I) communication technology. The on-board controller may retrieve upcoming traffic information including vehicle speed, a nature of relative movement of the line of vehicles, and acceleration profiles of each vehicle in the line of vehicles from the aforementioned remote sources. The on-board controller may also retrieve road segment characteristics data including gradient and curvature of road immediately ahead of the vehicle from the remote sources. A duration of engine shut-down of the vehicle during an upcoming possible engine idle-stop may be estimated based on the retrieved traffic information and road segment characteristics. In one example, if it is determined that the duration of engine shut-down is longer than a threshold duration, engine idle-stop may be initiated by suspending fueling to the engine cylinders. The threshold engine shut-down duration may be estimated based on fuel efficiency gained from the engine shut-down and electric motor power consumption for engine cranking during an engine start immediately following the shut-down. In another example, if it is determined that the duration of engine shut-down is longer than a threshold duration, one or more vehicle operating thresholds including a state of charge of an electric motor battery threshold and an electrical accessory load threshold may be modified to expedite engine shut down responsive to the idle-stop conditions being met. If it is determined that the duration of engine shut-down is shorter than a threshold duration, the engine may not be idle-stopped even if other idle-stop conditions are met. Upcoming periods of increased engine load may be estimated based on the retrieved traffic information and road segment characteristics. Regeneration of an exhaust particulate filter may be opportunistically scheduled during such periods of increased engine load.

In this way, by estimating the duration of engine shut-down of the vehicle during an upcoming possible engine idle-stop and idle-stopping the engine responsive to a longer than threshold estimated duration of the possible idle-stop, frequent engine idle-stops for shorter than threshold durations may be reduced. By estimating the threshold duration of the engine shut-down during a possible idle-stop based on fuel efficiency gained from the engine shut-down and electric motor power consumption for engine cranking during an immediate engine start following the shut-down, fuel efficiency benefits may be increased while reducing loss of battery power due to frequent operation of the starter motor. The technical effect of using traffic data including length of a line of vehicles ahead of the vehicle and relative movement within the line as available from external sources is that the estimation of the duration of engine shut-down of the vehicle during an upcoming possible engine idle-stop may be made with higher accuracy. By reducing repeated engine idle-stops for shorter than threshold durations, degradation of engine components may be lowered and perceivable changes to engine sound due to the frequent engine idle-stops may be reduced, thereby increasing overall operator satisfaction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
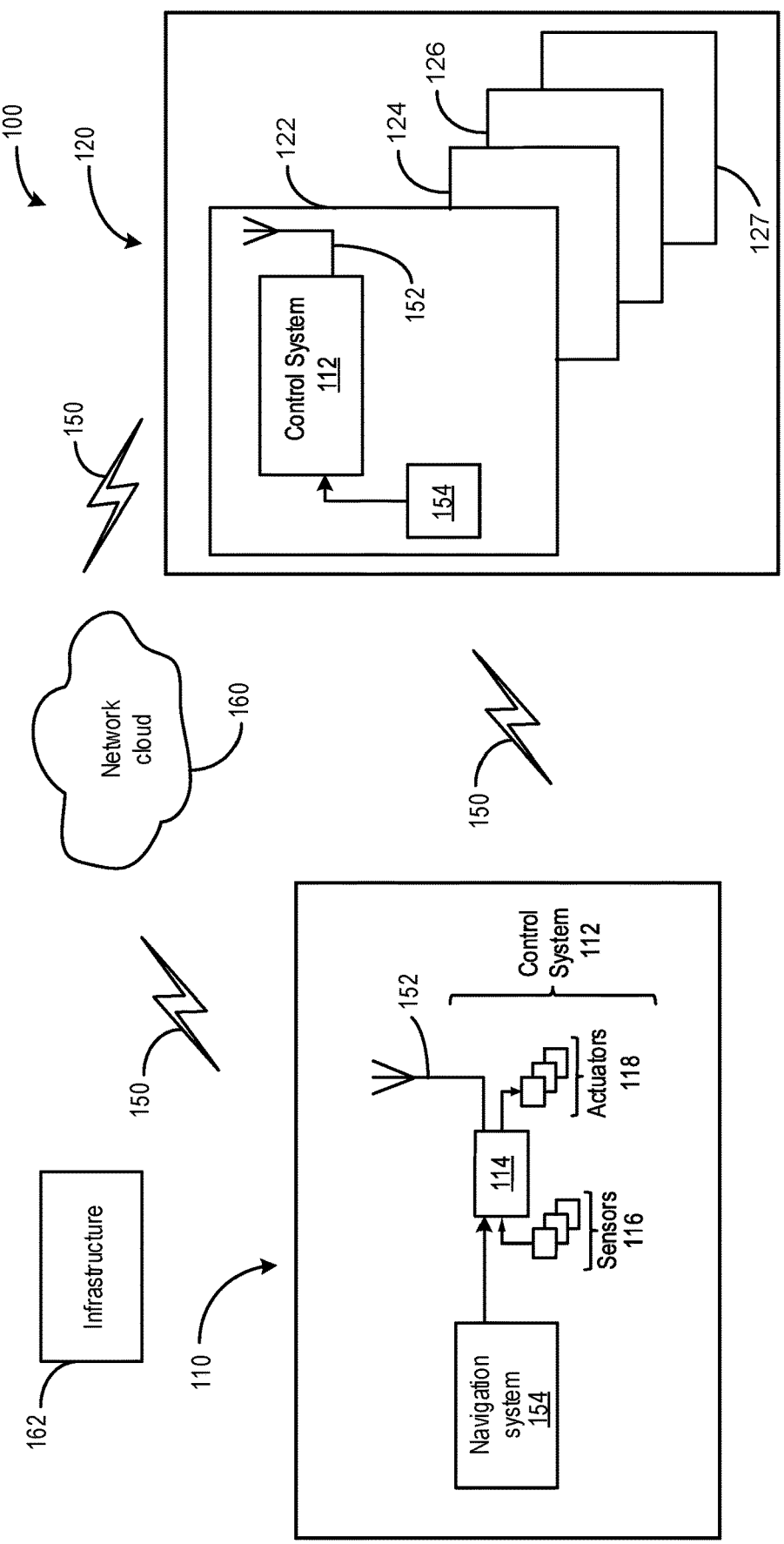
FIG. 1 shows an example embodiment of a vehicle system communicatively coupled to an external network and a line of vehicles travelling on a road immediately ahead of the vehicle.
Figure 2:
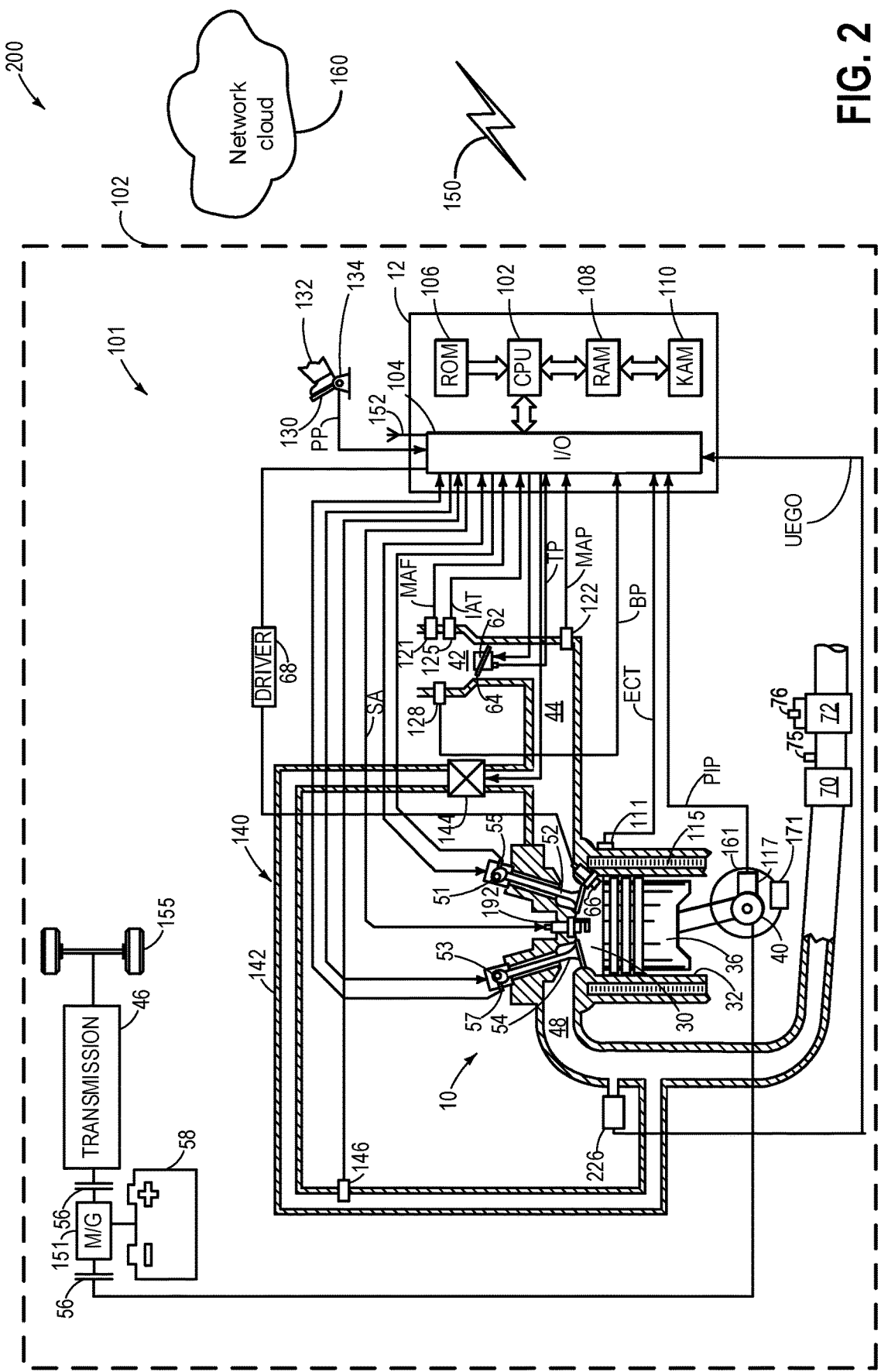
FIG. 2 shows an example engine system coupled to a hybrid vehicle.
Figure 5:
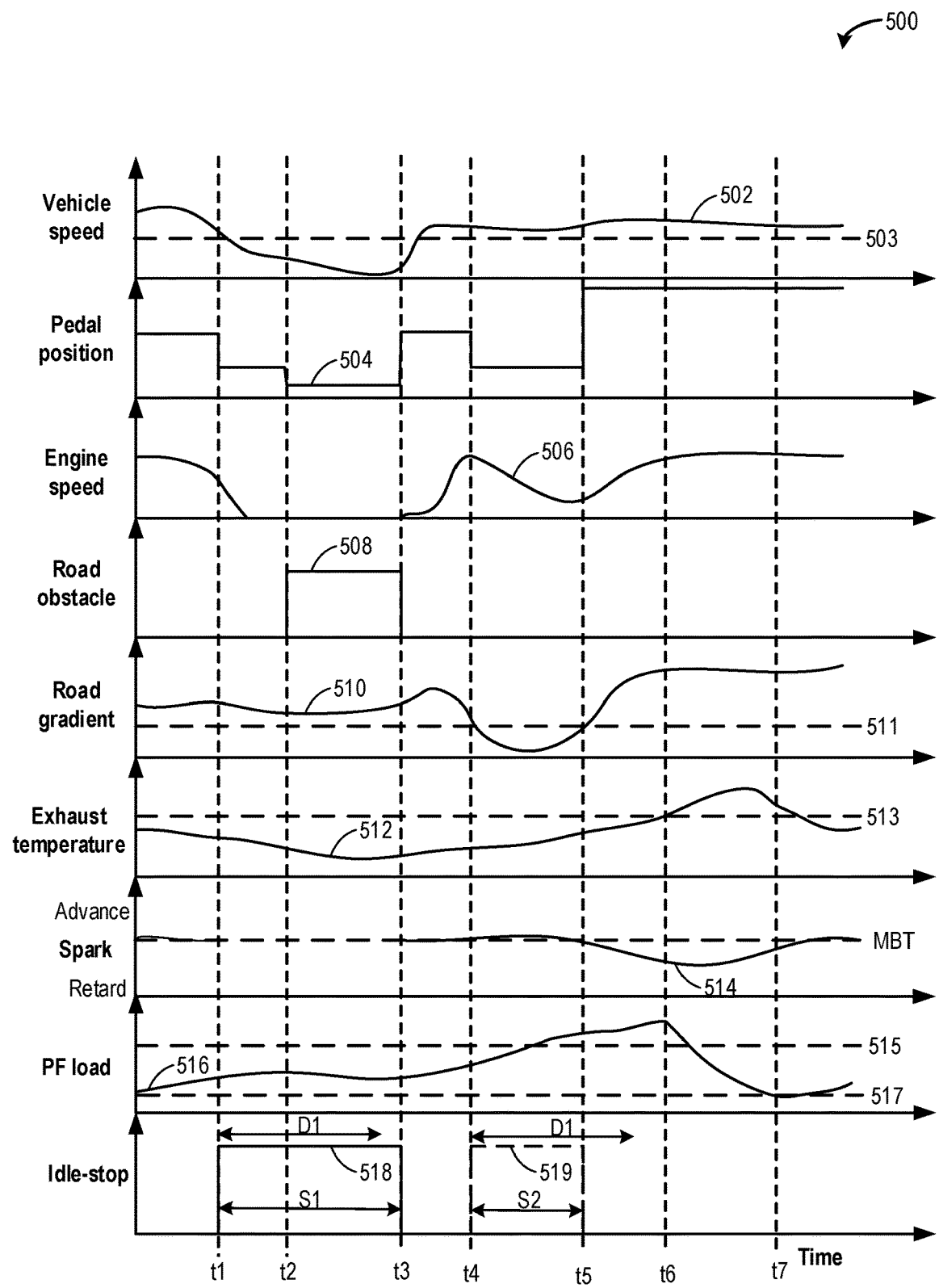
FIG. 5 shows an example control of engine idle-stop and PF regeneration based on data received from remote sources.
Figure 6:
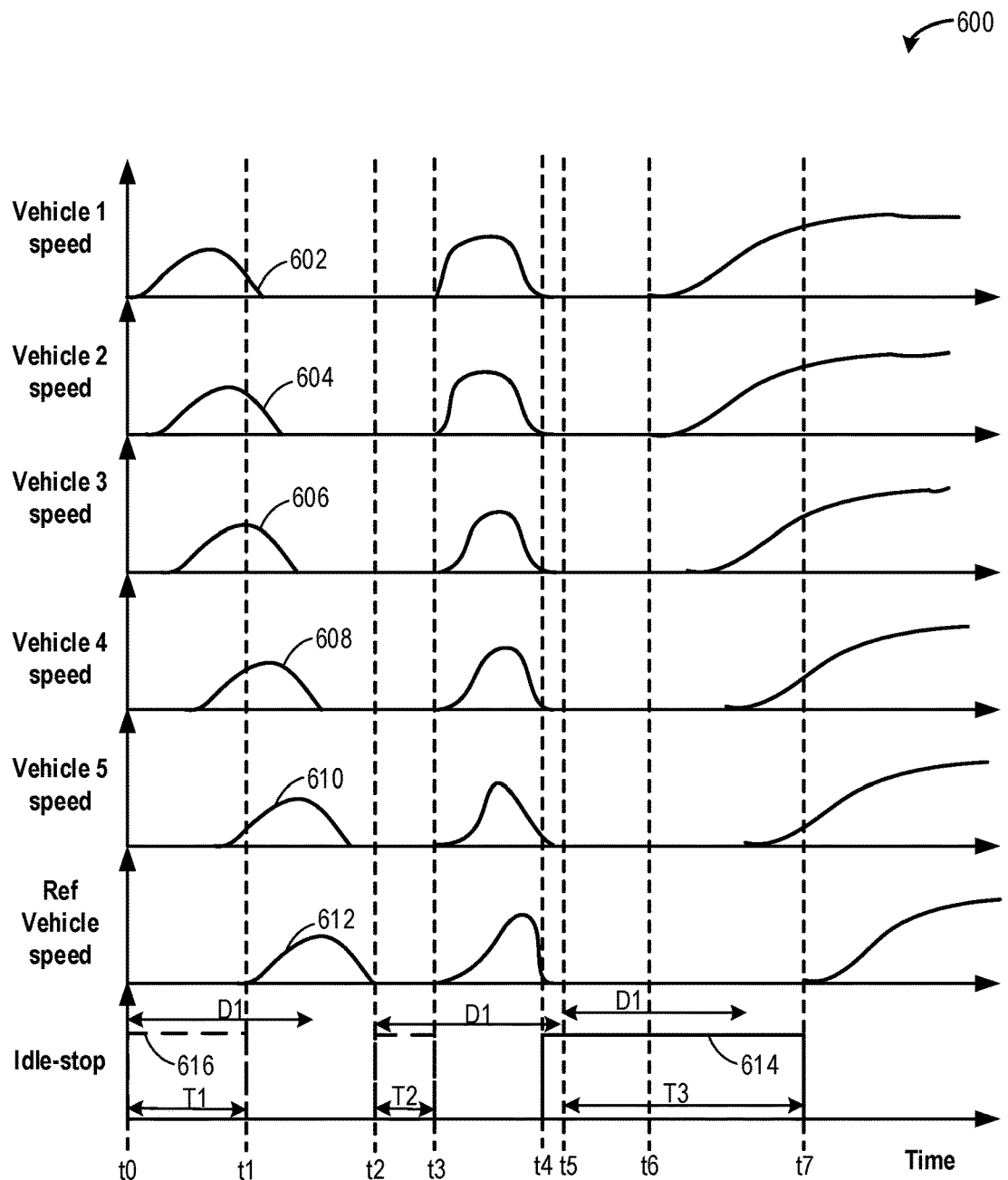
FIG. 6 shows relative motion between each vehicle within a line of vehicles travelling on a road.

The following description relates to systems and methods for controlling engine idle-stop based on upcoming traffic and road conditions data as received from remote sources. As described with reference to example engine systems coupled to a hybrid vehicle system, as shown in FIGS. 1-2, an on-board controller of the vehicle is communicatively coupled to one or more remote sources for receiving data including upcoming traffic and road conditions. The on-board controller may be configured to perform a control routine, such as the example routine of FIG. 3 controlling engine idle-stop based on the data received from the remote sources. The controller may also schedule regeneration of an exhaust particulate filter, such as via the control routine of FIG. 4, based on the data received from the remote sources. An example control of engine idle-stop and PF regeneration based on the data received from remote sources is shown in FIG. 5. FIG. 6 shows an example line of vehicles travelling in a road and relative motion amongst the vehicles in the line.

FIG. 1 shows example embodiment 100 of a vehicle system 110 in communication with a plurality of remote (external) sources via wireless communication 150. The remote sources may include a line of vehicles (also referred herein as fleet) 120 of vehicles travelling on a road directly ahead of the vehicle 110. The fleet 120 may comprise multiple vehicles 122, 124, 126, and 127. Each vehicle of the fleet 120 may include a control system 112 similar to the control system 112 of vehicle 110. A navigation system 154 and a wireless communication device 152 may be coupled to the control system 112 of each vehicle in the fleet 120. The on-board controllers in the vehicles in the fleet may communicate with each other and to the on-board controller in vehicle 110 via their respective navigation systems 154, via wireless communication device 152, and/or via other forms of vehicle to vehicle technology (V2V). The vehicles in the fleet 120 may also communicate with a network cloud 160 via wireless communication 150.

The remote sources may also include the network cloud 160 which may be an external server collecting traffic information from sources such as traffic cameras, overhead drones, helicopter cameras, in road sensors, etc. Detailed maps of data including road characteristics such as topography, road gradient, on-road curves and turns in the road of a certain area may be available in the network cloud 160. The vehicle 110 may communicate with the network cloud 160 directly via the wireless communication device 152 coupled to the on-board control system 112. The vehicle 110 may also communicate with the network cloud 160 via the navigation system 154 coupled to the on-board control system 112. The navigation system 154 may determine the current location of the vehicle 110 and obtain data including traffic conditions and road conditions ahead of the vehicle 110 from the network cloud 160 for use in controlling engine idle-stop.

The remote sources may further include infrastructure 162 such as traffic cameras, surveillance cameras, etc. The on-board controller 114 of vehicle 110 may communicate with the infrastructure via the respective navigation systems 154, via wireless communication device 152, and/or via other forms of vehicle to infrastructure technology (I2V).

The vehicle 110 may retrieve data including traffic conditions and road conditions from the remote for use in controlling engine idle-stop. Traffic conditions may include a number of vehicles in the line of vehicles (fleet) 120 stopping on a road directly ahead of the vehicle and in the vehicle's path of travel, relative movement of different vehicles within the line of vehicles 120, cause for the formation of the line of vehicles (such as traffic light, traffic stop sign, traffic stop due to road work, and traffic stop due to an accident), characteristics such as weight of each vehicle in the line of vehicles 120, upcoming intersections, upcoming road blocks and obstacles, etc. Road conditions may include characteristics of the current and an immediately upcoming (relative to the current location of the vehicle) road segment including road gradient, road curvature, etc. The controller may also use remote sensing technologies such as Light Detection and Ranging (LIDAR) and Radio Detection and Ranging (RADAR) to obtain traffic condition and road condition data. In LIDAR, a pulsed laser beam is transmitted from the vehicle controller 112 to an object (such as another vehicle, a traffic signal, an on-road obstacle, etc.) and the reflected laser beam is analyzed to determine a distance between the vehicle and the reflecting object. Similarly, in RADER, the controller may emit a radio wave and analyze the reflected radio wave to determine traffic conditions and road characteristics ahead of the vehicle and in the vehicle's path of travel.

Based on the data received from the remote locations, the controller 114 may estimate a duration of engine shut-down during a possible upcoming engine idle-stop. In response to the duration of engine shut-down being longer than a threshold, one or more vehicle threshold may be modified to initiate engine idle-stop. The one or more vehicle thresholds may include a duration of vehicle stopping threshold, a state of charge of an electric motor battery threshold, and an electrical accessory load threshold, where the electric motor battery supplies energy for engine cranking immediately after the engine shut-down, and where the electrical accessory includes an air-conditioning system. Details of controlling the engine idle-stop based on data received from remote sources is discussed with reference to FIG. 3.

Control system 112 is shown receiving information from a plurality of sensors 116 and sending control signals to a plurality of actuators 118. As one example, sensors 116 may include manifold absolute pressure intake air temperature (IAT) sensor, outside air temperature (OAT) sensor, manifold absolute pressure (MAP) sensor, barometric pressure (BP) sensor, and exhaust gas oxygen sensor (such as a UEGO sensor). As one example, actuators 118 may include fuel injectors and spark plugs coupled to one or more engine cylinders. Based on signals received from the different sensors 116 and data received from the remote sources (such as the network cloud 160, infrastructure 162, other on-road vehicles 120), the engine operations are regulated and consequently the controller 114 sends control signals to engine actuators 118.

FIG. 2 is a schematic diagram 200 showing a vehicle system 102 comprising an engine system 101. The vehicle system may be a hybrid vehicle system further comprising an electric motor 151 for operating the vehicle. FIG. 2 shows one cylinder of a multi-cylinder engine 10 in the engine system 101. The engine 10 may be controlled at least partially by a control system including a controller 12 and by input from a vehicle operator 132 via an input device 130. As an example, the controller 12 in FIG. 2 may be the controller 114 in FIG. 1. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor 171 may be coupled to crankshaft 40 via flywheel 161 to enable cranking (e.g., spinning the engine via the starter) of engine 10, typically used for starting the engine. When starting an engine, after combustion occurs, actuation of the starter is ceased as combustion facilitates spinning of the engine. In one example, starter motor 171 may be a conventional starter motor. In other examples, starter motor 171 may be an integrated starter motor, such as those typically found on hybrid vehicles.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

In some embodiments, each cylinder of engine 10 may include a spark plug 192 for initiating combustion. Ignition system can provide an ignition spark to combustion chamber 30 via spark plug 192 in response to spark advance signal SA from controller 12, under select operating modes. However, in some embodiments, spark plug 192 may be omitted, such as where engine 10 may initiate combustion by compression ignition or by injection of fuel as may be the case with some diesel engines. In one example, during selective deactivation of one or more engine cylinders (via VDE mechanism), spark supplied to the deactivated cylinders may also be stopped, such as by disabling operation of the spark plug 192.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125 and the barometric pressure (BP) sensor 128. The IAT sensor 125 estimates intake air temperature to be used in engine operations and provides a signal to the controller 12. The BP sensor 128 estimates the ambient pressure for engine operations and provides a signal to the controller 12. The intake passage 42 may further include a mass air flow sensor 121 and a manifold air pressure sensor 122 for providing respective signals MAF and MAP to the controller 12.

An exhaust gas sensor 226 is shown coupled to the exhaust passage 48 upstream of an emission control device 70. The sensor 226 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor. Input from the exhaust gas sensor 226 may also be used to estimate ambient humidity. An exhaust temperature sensor 75 may be coupled to the exhaust passage 48 downstream of an emission control device 70.

An exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An emission control device 70 is shown arranged along the exhaust passage 148 downstream of the exhaust gas sensor 126. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

A particulate filter (PF) 72 is shown arranged along the exhaust passage 48 downstream of the emission control device 70. The particulate filter 72 may be a gasoline particulate filter or a diesel particulate filter. A substrate of the particulate filter 72 may be made of ceramic, silicon, metal, paper, or combinations thereof. During operation of the engine 10, particulate filter 72 may capture exhaust particulate matter (PMs), such as ash and soot (e.g., from unburned hydrocarbons) in order to reduce vehicle emissions. As particulate matter accumulates on the PF 72, the exhaust back pressure may increase which may negatively influence the engine performance. Particulate matter load on the PF may be estimated based on the exhaust backpressure as estimated via a pressure sensor 76 coupled across the PF. The pressure sensor 76 may be a differential (delta) pressure sensor that measures the change in exhaust pressure as exhaust flows through the PF, such as a Delta Pressure Feedback Exhaust (DPFE) sensor. In other examples, the pressure sensor may be an absolute pressure sensor and the controller may measure the pressure change across the PF based on outputs from pressure sensors coupled upstream and downstream of the filter. Once the PF reaches a threshold load, the PF 72 may be periodically or opportunistically regenerated to reduce the particulate matter load and the corresponding exhaust back pressure. In order to regenerate the PF, a higher than threshold exhaust temperature and a leaner than stoichiometric is desired at the PF. An increase in exhaust temperature may correspond to increased torque demand. The on-board controller of the vehicle may wirelessly communicate with external sources such as other vehicles travelling immediately ahead of the vehicle, traffic cameras, remote servers to obtain data including upcoming road characteristics and traffic conditions. Based on the data obtained from the external sources, upcoming torque demand may be estimated. During an upcoming higher than threshold torque demand, regeneration of the PF 72 may be scheduled, the scheduling including regarding spark timing from maximum brake torque (MBT) to obtain a higher than threshold exhaust gas temperature and adjusting a pulse rate of fuel injection to the one or more cylinders to obtain a leaner than stoichiometric air fuel ratio.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust AFR from oxygen sensor 226, inducted mass air flow (MAF) from the mass air flow sensor 121; engine coolant temperature (ECT) from a temperature sensor 111 coupled to a cooling sleeve 115; exhaust temperature from a temperature sensor 75 coupled to exhaust passage 48; exhaust pressure from a pressure sensor 76 coupled across the exhaust particulate filter; a profile ignition pickup signal (PIP) from a Hall effect sensor 117 (or other type) coupled to crankshaft 40; throttle position (TP) from a throttle position sensor; absolute manifold pressure signal, MAP, from the sensor 122; and intake air temperature, from IAT sensor 125. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 117, which is also used as an engine speed sensor, may produce a predetermined number of equally spaced pulses every revolution of the crankshaft. The controller 12 may be coupled to a wireless communication device 152 for direct communication of the vehicle 102 with a network cloud 160. Using the wireless communication 150 via the device 152, the vehicle 102 may retrieve data regarding current and/or upcoming traffic and road conditions from the network cloud 160.

The storage medium read-only memory 106 can be programmed with computer readable data representing non-transitory instructions executable by the processor 102 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

The controller 12 receives signals from the various sensors of FIG. 2 and employs the various actuators of FIG. 2 to adjust engine operation based on the received signals and instructions stored on a memory of the controller 12. In one example, based on data including upcoming traffic and road conditions as received from the network cloud 160 via the wireless communication device 152, the controller may initiate an engine idle-stop by sending a signal to the fuel injector 66 and the spark plug 192 to suspend fueling and spark to the engine cylinders, respectively. In another example, based on the traffic and road conditions data, the controller may determine an upcoming period of higher than threshold torque demand and during this period, the controller may send a signal to the fuel injector 66 to adjust the engine air fuel ratio to be leaner than stoichiometric, thereby facilitating PF 72 regeneration.

In some examples, vehicle 102 may be a hybrid vehicle with multiple sources of torque available to one or more vehicle wheels 155. In other examples, vehicle 102 is a conventional vehicle with only an engine, or an electric vehicle with only electric machine(s). In the example shown, vehicle 102 includes engine 10 and an electric machine 151. Electric machine 151 may be a motor or a motor/generator. Crankshaft 40 of engine 10 and electric machine 151 are connected via a transmission 46 to vehicle wheels 155 when one or more clutches 56 are engaged. In the depicted example, a first clutch 56 is provided between crankshaft 40 and electric machine 151, and a second clutch 56 is provided between electric machine 151 and transmission 46. Controller 12 may send a signal to an actuator of each clutch 56 to engage or disengage the clutch, so as to connect or disconnect crankshaft 40 from electric machine 151 and the components connected thereto, and/or connect or disconnect electric machine 151 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 151 receives electrical power from a traction battery 58 to provide torque to vehicle wheels 155. Electric machine 151 may also be operated as a generator to provide electrical power to charge traction battery 58, for example during a braking operation.

In this way, the systems of FIGS. 1-2 enable a system for a hybrid vehicle comprising: an engine including one or more cylinders, one or more fuel injectors and spark plugs coupled to the one or more cylinders, an engine exhaust passage including a particulate filter, an electric motor including a battery, the motor coupled to a crankshaft, an air-conditioning system, a navigation system configured to determine a geographical location of the vehicle, an on-board controller communicatively coupled to each of an off-board controller and a plurality of on-board controllers of vehicles travelling within a threshold radial distance. The on-board controller includes computer-readable instructions stored on non-transitory memory for: during on-road vehicle travel, transmitting the geographical location of the vehicle to the off-board controller, receiving a first set of data including relative distance between vehicles travelling ahead of the vehicle and relative speed between the vehicles travelling ahead of the vehicle from the off-board controller and the on-board controllers of the vehicles travelling within the threshold radial distance, receiving a second set of data including road gradient and road curvature immediately ahead of the vehicle, estimating a duration of operation of the vehicle at a lower than threshold speed based on each of the first set of data and the second set of data, and adjusting fueling to the one or more cylinders based on the duration of operation of the vehicle at a lower than threshold speed.

Figure 3:
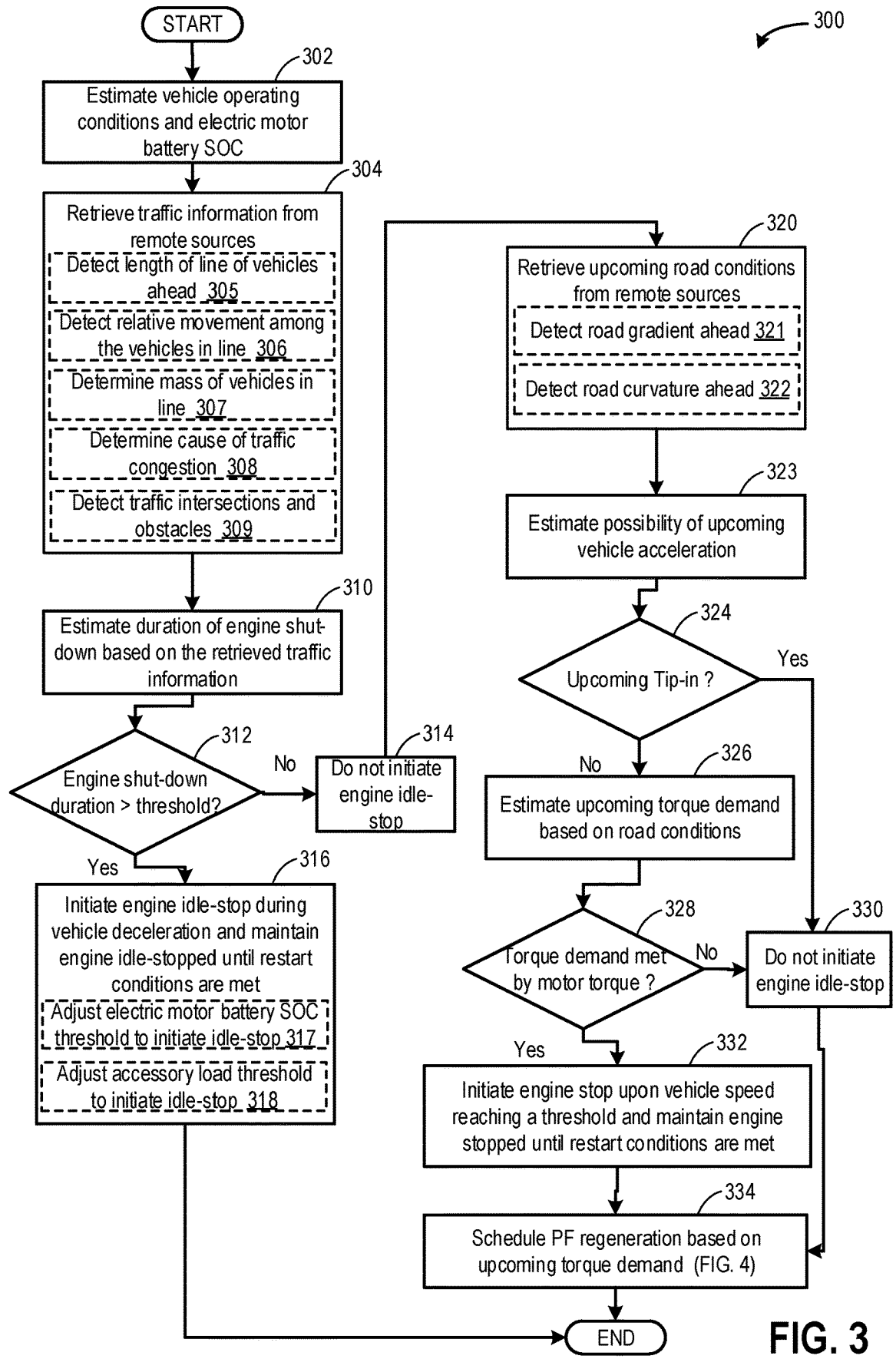
FIG. 3 is a flow chart illustrating an example method that may be implemented for controlling engine idle-stop based on traffic and road conditions data received from remote sources.

FIG. 3 shows an example method 300 that may be implemented for controlling engine idle-stop based on traffic and road conditions data received from remote sources. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, exhaust temperature, manifold pressure, manifold air flow, exhaust pressure, etc. In addition, ambient conditions such as ambient humidity, temperature, and barometric pressure may be estimated. State of charge of a battery coupled to the starter motor used for engine cranking may be estimated. Also, state of charge of the battery (such as battery 58 in FIG. 2) coupled electric machine used for propelling the hybrid electric vehicle (HEV) via motor torque may be estimated. In one example, the battery of the electric machine may be used to operate the starter motor during engine cranking.

At 304, the controller may retrieve traffic information from one or remote sources such as an external server, traffic cameras, on-board controller of one or more vehicles in a line of vehicles on a road immediately ahead of the vehicle (such as vehicle 110 in FIG. 1, also referred herein as the reference vehicle), and overhead drones. In one example, the on-board controller of the vehicle may be communicatively coupled to on-board controllers of one of more vehicles in the line of vehicles via their respective navigation systems, via wireless communication devices, and/or via other forms of vehicle to vehicle technology (V2V). In another example, the on-board controller of the vehicle may be communicatively coupled to infrastructure such as traffic cameras, surveillance cameras, etc. via the respective navigation systems, via wireless communication devices, and/or via other forms of vehicle to infrastructure technology (I2V). Some vehicles, such as autonomous vehicles (AV) may be equipped with object recognition technology wherein the controller may use remote sensing technologies such as Light Detection and Ranging (LIDAR) and Radio Detection and Ranging (RADAR) to obtain traffic condition. For such object recognition techniques, reflection of laser or radio signals emitted by the vehicle may be analyzed to determine distance between the vehicle and the obstacle reflecting the laser or radio signal and also to identify the type of obstacle reflecting the signal (such as another moving vehicle, infrastructure, on-road construction equipment, etc.). The controller may also retrieve traffic information from helicopters and communication satellites via wireless communication.

Retrieving traffic information from the remote sources includes, at 305, detecting a length of line of the vehicles on the road ahead of the vehicle. The length of the line of vehicles includes a number of vehicles stopping or moving with a lower than threshold speed on the road ahead of the vehicle. In one example, the threshold vehicle speed may correspond to a vehicle speed at which vehicles driving immediately behind the line of vehicles may be not be able to accelerate. In another example, threshold vehicle speed may be a percentage of the speed limit of the road. In yet another example, the threshold vehicle speed may be 5 mph. The line of the vehicles may be caused due to traffic congestion ahead of the first vehicle in the line of vehicles which may cause the reference vehicle to travel at the lower than threshold speed and/or to stop multiple types. As an example, due to technical limitations, the reference vehicle may not be able to communicate with each vehicle in the line of vehicles. During such scenarios, when the vehicles in the line of vehicles are stopped, a gap between two vehicles communicatively coupled to the reference vehicle may be estimated and the length of the gap may be divided by an average length of road occupied by a stopped vehicle to detect the number of vehicles stopped in between the two vehicles.

In one example, a line of vehicles may be determined present when a group of vehicles are arranged in the vehicle's path of travel, each vehicle in the group of vehicles is separated from a vehicle immediately in front of each vehicle by less than a threshold distance (e.g., 50 meters), and speeds of each of the vehicles is less than a predetermined speed (e.g., 36 kilometers/hr). The length of the line of vehicle may be detected or determined via receiving a position of a vehicle (e.g., a first vehicle) in the line that is furthest from the vehicle and computing the distance from a position of the first vehicle to the position of the second vehicle. In one example, the distance may be computed via GPS and/or map data. In another example, the distance may be computed using remote sensing technologies such as Light Detection and Ranging (LIDAR) and Radio Detection and Ranging (RADAR).

Retrieving traffic information from the remote sources also includes, at 306, detecting relative motion among vehicles in the line of vehicles. The relative motion includes a speed of a first vehicle in the line of vehicles and the speed of each intermediate vehicle in the line of vehicles. As such, the first vehicle may be furthest from the reference vehicle relative to each intermediate vehicle from the reference vehicle. Each vehicle in the line of vehicles may start moving and stop moving independently of the other vehicles in the line. A delay time here is a time between when one vehicle in the line (e.g., the first vehicle) begins to move after being most recently stopped to the time another vehicle (e.g., the second or third vehicle in line) begins to move after the other vehicle is most recently stopped. However, if the other vehicle is moving while the one vehicle begins to move, the delay time of the other vehicle may be a delay time of a vehicle nearest to and in front of the other vehicle. For example, if the first through fifth vehicles in the line of vehicles are stopped and a sixth vehicle is moving toward the fifth vehicle when the first vehicle begins to move, the delay time of the sixth vehicle may be adjusted to a delay time between the first vehicle and the fifth vehicle. Delay times may be referenced to vehicles other than the first vehicle to ascertain delay times within the line of vehicles. For example, a delay time may be established between the fourth vehicle in the line of vehicles and the tenth vehicle in the line of vehicles. A delay time between beginning of motion of the first vehicle after its most recent stop ends and the beginning of motion of each intermediate vehicle after the most recent stop of the first vehicle may be estimated. Due to the time delays between the beginning of motion of the first vehicle and each intermediate vehicle and frequent vehicle stops and subsequent starts, and time delays between intermediate vehicles, the overall movement of the line of vehicles in the vehicle line may have an undulating (wave like pattern) pattern. The undulating pattern of vehicle movements in the line of vehicles is further elaborated with reference to FIG. 6. A frequency of vehicle movement in the line of vehicles may be estimated based on an average duration of vehicle movement (such as for the reference vehicle) before the vehicle is stopped (t1) and an average duration that the vehicle is stopped (such as for the reference vehicle) before it starts moving again (t2).

Retrieving traffic information from the remote sources further includes, at 307, determining a weight or mass of one or more vehicles in the line of vehicles. The weight of a vehicle may be directly correlated to the acceleration profile (e.g., a curve or function that describes acceleration of a vehicle for different vehicle masses at a predetermined nominal torque demand) of the vehicle. In one example, vehicles with a larger weight such as a fully loaded truck may take a longer time to accelerate from rest relative to a sedan carrying a single passenger. The acceleration profiles of the vehicles in the line of vehicles may affect the relative motion among vehicles in the line of vehicles. As an example, if there one or more vehicles in the line of vehicle that take a longer time to accelerate relative to the remaining vehicles in the line, the overall speed of movement of the line may be reduced, thereby increasing the average duration that the reference vehicle is stopped before it starts moving again (t2).

Retrieving traffic information from the remote sources also includes, at 308, determining the cause for traffic congestion (formation of the line of vehicles directly ahead of the reference vehicle). The formation of the line of vehicles may be due to a cause such as a traffic signal, a stop sign, road construction work causing reduction in speed limit and/or lane closures, flagger controlling traffic flow during road construction, an accident causing road closures, etc. The duration of vehicle stop between successive movements (t2) may be based on the cause of the traffic congestion. In one example, a traffic congestion caused due to a traffic signal being red may clear up within a shorter duration relative to traffic congestion due to an accident that has caused road closure. Also, the relative motion among vehicles in the line of vehicles may be based on the cause of the traffic congestion. As an example, a traffic congestion caused by a stop sign may have a higher frequency of vehicle movement in the line of vehicles relative to the frequency of vehicle movement in the line of caused when the congestion is caused due to a lane closures during road construction work.

Retrieving traffic information from the remote sources further includes, at 309, detecting traffic intersections and obstacles on the road segment directly ahead of the reference vehicle. An upcoming traffic intersection may cause the reference vehicle to stop such as when the traffic light turns red. An upcoming on-road obstacle such as a broken down car or construction equipment occupying a lane may cause traffic congestion.

At 310, a duration of engine shut-down (t3) during a prospective engine idle-stop while the vehicle is stopped or is decelerating may be determined based on the abovementioned traffic information retrieved from the remote sources. If the reference vehicle is stopped for a longer than a threshold duration, the engine may be stopped (engine idle-stop) to reduce fuel consumption and improve emissions quality. Engine shut-down during idle-stop improves fuel efficiency but each time the engine is restarted from the idle-stop, energy from the battery may be used to crank the engine via a starter motor. The threshold specifies the duration the vehicle is stopped before the engine is shut-down (engine is deactivated where it stops rotating and it is not supplied with fuel) may be dynamically calibrated (adjusted) based on the above mentioned traffic conditions and data indicating duration of vehicle movement before stopping (t1) and an average duration that the vehicle is stopped before it starts moving again (t2). As an example, if t1 decreases, the threshold specifying the duration the vehicle is stopped before the engine is shut-down may be increased and if t2 increases, the threshold specifying the duration the vehicle is stopped before the engine is shut-down may be decreased. In this way, the threshold vehicle stopping time before the engine is deactivated may be adjusted based on each of a duration of vehicle movement before stopping and a duration of vehicle stop between successive movements of vehicles ahead of the reference vehicle, the adjusting including decreasing the threshold vehicle stopping time before the engine is deactivated as the duration of vehicle movement (for vehicles ahead of the reference vehicle) before stopping decreases and the duration of vehicle stop increases. Also, the threshold vehicle stopping time before the engine is deactivated may be adjusted based on the number of vehicles stopping on the road ahead of the reference vehicle. As an example, the threshold vehicle stopping time may be decreased with an increase in the number of vehicles stopping on the road ahead of the reference vehicle and the threshold vehicle stopping time may be increased with a decrease in the number of vehicles stopping on the road ahead of the reference vehicle.

In one example, the controller may estimate engine shut-down (t3) duration during a prospective engine idle-stop as a function of on one or more of the length of the line ahead of vehicles ahead of the reference vehicle, the relative movement among each vehicle in the line of vehicles, acceleration profile for each vehicle in the line of vehicles, cause resulting in formation of the line of vehicles, and upcoming road obstacles. In another example, the controller may estimate t3 based on a calculation using a look-up table holding empirically determined values with the input being each of the length of the line ahead of vehicles ahead of the reference vehicle, the relative movement among each vehicle in the line of vehicles, acceleration profile for each vehicle in the line of vehicles, cause resulting in formation of the line of vehicles, and upcoming road obstacles and the output being the engine shut-down (t3) duration during the prospective engine idle-stop. For example, values in the lookup table may increase the estimated amount of time the engine will be shut-down as time delays between movements of intermediate vehicles (e.g., affects relative movement of vehicles in the line of vehicles) in the line of vehicles increases. Further, values in the lookup table may increase the estimated amount of time the engine will be shut-down as time length of the line of vehicles increases. Further still, values in the lookup table may provide a larger increase to the estimated amount of time the engine will be shut-down when a traffic accident is detected as compared to an adjustment to the estimated amount of time the engine will be shut-down when the road obstacle is a stop sign. In this way, a duration of engine shut-down for the reference vehicle may be estimated based on each of the length of the line of vehicles, relative movement within the line, the characteristics of the one or more vehicles in the line of vehicles, the cause for formation of the line of vehicles, etc.

At 312, the routine includes determining if the duration of engine shut-down (t3) during a prospective engine idle-stop is greater than a threshold duration. The threshold duration of engine shut-down may be based on an amount of energy saved by idle-stopping the engine. The overall energy savings (and the threshold duration of engine shut-down) may be based on fuel efficiency gained from the engine shut-down and electric motor power consumption for engine cranking during an immediate engine start following the shut-down. The overall energy savings increases with each of an increase in fuel efficiency gained from the engine shut-down and a decrease in electric motor power consumption for engine cranking during an immediate engine start. In one example, the duration of engine shut-down threshold may correspond to a positive (higher than zero) overall energy savings during a prospective engine idle-stop. One or more vehicle operating threshold may be adjusted directly based on the traffic conditions. In one example, the duration of engine shut-down threshold may be decreased as the number of vehicles on the road ahead of the reference vehicle increases. As the length of the line of vehicles increases, the duration of engine shut-down (t3) during the prospective engine idle-stop may increase, therefore in order to expedite the initiation of the engine idle-stop (and thereby increase the fuel efficiency benefit obtained from the engine idle-stop), the duration of engine shut-down threshold may be decreased.

If it is determined that the duration of engine shut-down (t3) during the prospective engine idle-stop is greater than a threshold duration, at 316, an engine idle-stop may be initiated during the time the vehicle decelerates before coming to a complete stop (vehicle speed zero). The controller may send a signal to the fuel injectors coupled to the engine cylinders to suspend fueling to each of the engine cylinders to stop combustion. Also, in order to stop combustion, the controller may send a signal to the spark plugs coupled to the engine cylinders to deactivate spark. As fueling and spark is deactivated the engine may spin down (causing engine shut-down). Engine shut-down (rolling stop-start) may be initiated during vehicle deceleration once the vehicle speed reduces to below a threshold speed. In one example, the threshold speed may be 10 MPH. By initiating engine shut-down even before the vehicle stops completely, the duration of engine shut-down may be increased, thereby increasing the energy efficiency achieved during the engine idle-stop.

As such, in order to initiate engine idle-stop, one or more vehicle operating conditions may be estimated and compared to the respective vehicle operating thresholds, and if the vehicle operating conditions is within the respective threshold, the engine idle-stop may be initiated. If the duration of engine shut-down (t3) during the prospective engine idle-stop (as estimated based on traffic data obtained from remote sources) is greater than the threshold duration, one or more vehicle operating threshold may be adjusted to initiate the engine shut-down.

Adjusting the one or more vehicle operating thresholds for initiating the engine idle-stop includes, at 317, adjusting a threshold state of charge (SOC) of battery coupled to an electric motor (such as electric machine 52 in FIG. 2) used to crank the engine during an engine restart immediately following the engine idle-stop and/or to propel the vehicle via motor torque. Adjusting the threshold SOC includes decreasing the threshold SOC to a second threshold SOC from a first threshold SOC so that the engine idle-stop may be initiated even if the actual battery SOC is lower than the first threshold prior to the adjustment (but higher than the second threshold), thereby increasing the possibility of engine idle-stop. The second threshold SOC may correspond to the minimum battery SOC required to crank the engine during the immediately subsequent engine restart following the idle-stop. However, in one example, if the battery SOC is lower than the second threshold SOC, even if the duration of engine shut-down (t3) during the prospective engine idle-stop is higher than the threshold duration, engine idle-stop may not be activated.

Adjusting the one or more vehicle operating thresholds for initiating the engine idle-stop may also include, at 318, adjusting an electrical accessory load threshold. The electrical accessory load may be the engine power used to operate an air conditioning system. Adjusting the electrical accessory load includes increasing the threshold accessory load from a first load to a second load so that the engine idle-stop may be initiated even if the actual accessory load is higher than the first threshold load but lower than the second threshold load, thereby increasing the possibility of engine idle-stop. The second threshold load may correspond to the minimum engine power desired to maintain the current operation of the air conditioning system. However, in one example, if the actual electrical accessory load is higher than the second threshold load, even if the duration of engine shut-down (t3) during the prospective engine idle-stop is higher than the threshold duration, engine idle-stop may not be activated.

In another example, engine heat may be desired to maintain an exhaust catalyst (such as emission control device 70 in FIG. 2) above a catalyst light-off temperature. Therefore, if the exhaust catalyst temperature is below a threshold temperature, even if duration of engine shut-down (t3) during the prospective engine idle-stop is greater than a threshold duration, engine idle-stop may not be initiated. The threshold catalyst temperature may be calibrated based on the catalyst light-off temperature.

The engine may be maintained idle-stopped until one or more engine restart conditions are met. The engine restart conditions may include, an increased torque demand due to vehicle start immediately following the engine idle-stop, a decrease in the SOC of battery coupled to an electric motor to below the second threshold SOC, and an increase in the electrical accessory load to above the second threshold load. In response to one or more engine restart conditions being met, the controller may send a signal to the starter motor to crank the engine. Also, the controller may send a signal to the fuel injectors coupled to the engine cylinders to resume fueling to each of the engine cylinders to initiate combustion. The controller may send a signal to the spark plugs coupled to the engine cylinders to activate spark.

Returning to step 312, if it is determined that the duration of engine shut-down (t3) during the prospective engine idle-stop is less than a threshold duration, at 314, the engine idle-stop may not be initiated. Since the duration of engine shut-down is less than the threshold duration, it may be inferred that by shutting down the engine for a shorter duration, energy efficiency benefits may be improved. By reducing repeated engine idle-stops for shorter than threshold durations, degradation of engine components may be lowered and perceivable changes to engine sound due to the frequent engine idle-stops may be reduced, thereby increasing overall operator satisfaction. In this way, the engine may be maintained in an active condition by maintaining fueling to the engine in response to one or more of the duration of engine shut-down for the vehicle being lower than the threshold duration, the state of charge of the electric motor battery being less than the threshold state of charge of the electric motor battery and the electrical accessory load on the engine being greater than the threshold electrical accessory load on the engine.

At 320, the controller may retrieve upcoming road conditions information such as characteristics of the road segment immediately ahead of the vehicle from one or remote sources such as an external server, traffic cameras, on-board controller of one or more vehicles in a line of vehicles on a road immediately ahead of the vehicle (also referred herein as the reference vehicle), and overhead drones communicatively coupled to the controller via wireless communication. The controller may determine the current location of the vehicle via a navigation system coupled to the vehicle and detailed maps of data including road characteristics such as topography, road gradient, on-road curves and turns in the road of a certain area may be obtained for a road segment immediately ahead of the vehicle from a remote server. In one example, road segment maps may be obtained for a distance of 10 miles ahead of the current location of the vehicle.

Retrieving upcoming road conditions includes, at 321, detecting a current road gradient and the upcoming gradient of the road segment immediately ahead of the vehicle. There may be frequent changes to road gradient when the vehicle is travelling through hilly areas. The road gradient may include an uphill slope followed by a downhill slope. The degree of inclination of each slope and the distance between road segments where the slope changes may be estimated.

Retrieving upcoming road conditions also includes, at 322, detecting curvatures and turns in the road segment immediately ahead of the vehicle. The number of turns or curves, the nature of the turns, the degree of the turns (such as the road turns an angle of 45°) may be determined.

At 323, a possibility of upcoming vehicle acceleration within a threshold duration may be estimated based on road conditions and traffic information as retrieved from remote sources. In one example, the threshold duration may be two seconds from the current time. In one example, a vehicle operator may accelerate by tipping in (e.g., applying) the accelerator pedal for increased torque demand. In one example, when the vehicle is travelling down a slope, the vehicle operator may tip-out (e.g., at least partially releasing the accelerator pedal) but there may be an uphill slope immediately ahead which may cause the operator to tip-in within the threshold duration. Thus, when road grade changes from negative to positive, the possibility of an impending tip-in may be high. Conversely, when road grade changes from positive to negative, the possibility of an impending tip-out may be high. Also, a vehicle may be operating at a lower engine speed-load condition during a traffic congestion caused by an on-road obstacle but once the obstacle is crossed, the traffic congestion may be cleared and the operator may tip-in requesting a higher engine torque output such that the possibility of tip-in may be high.

At 324, the routine includes determining if an upcoming tip-in of the accelerator pedal is expected within the threshold time duration. In one example, method 300 determines if an upcoming tip-in of the accelerator pedal is expected within the threshold duration of time if the vehicle is traveling on a road where grade changes from negative to positive and if the vehicle will pass over the section of road that includes the grade change within a threshold amount of time based on vehicle speed, vehicle position, and location of the road grade condition. If it is determined that an upcoming tip-in is expected within the threshold time duration, at 330, an engine idle-stop may not be initiated even if other entry conditions for initiation of an engine idle-stop is confirmed. If an engine idle-stop is initiated without taking into account the upcoming increase in engine torque demand, the engine may have to be restarted by cranking within a shorter duration. In this way, engine idle-stops of shorter than threshold durations may be reduced and overall energy efficiency may be improved.

If it is determined that an upcoming tip-in is not expected within the threshold duration, at 326, an upcoming torque demand may be estimated based on upcoming road conditions and traffic information as retrieved from the remote sources. Torque demand includes the amount of torque requested to propel the vehicle at a desired speed. In one example, based on the retrieved traffic information, presence or absence of upcoming traffic congestion may be determined and during the traffic congestion, the vehicle may travelling at a lower speed and the upcoming torque demand may be lower. In another example, based on the retrieved road conditions data, an upcoming uphill slope may be determined and during the uphill travel, the upcoming torque demand may increase. The upcoming torque demand may be estimated from vehicle mass, road grade, and road load using Newton's laws.

At 328, the routine includes determining if the estimated torque demand may be met by motor torque as supplied by the electric machine of the hybrid electric vehicle. As such, a vehicle may be propelled via engine torque, motor torque, or a combination of both. In order to fulfil the torque demand, a threshold state of charge (SOC) of the battery coupled to the electric machine may be desired. In one example, the controller may determine the threshold SOC based on a calculation using a look-up table with the input being the estimated torque demand and the output being the threshold SOC. The controller may determine the actual SOC of the battery and compare it to the threshold SOC.

If it is determined that the actual SOC of the battery is lower than the threshold SOC, it may be inferred that the torque demand may not be met by motor torque and engine torque may continue to be desired for vehicle operation. Consequently, at 330, an engine stop may not be initiated even if other entry conditions for initiation of an engine idle-stop is confirmed. If it is determined that the actual SOC of the battery is higher than the threshold SOC, it may be inferred that the torque demand may be met by motor torque and engine torque may not be requested for vehicle operation. Consequently, at 332, the controller may initiate an engine stop by sending signals to the fuel injectors and spark plugs coupled to the cylinders to suspend fueling and spark to the engine cylinders, respectively. The engine may be maintained stopped until one or more engine restart conditions are met. The engine restart conditions may include, an increased torque demand and/or a decrease in the SOC of battery coupled to an electric motor to below the threshold SOC desired for operating the vehicle solely using motor torque. In response to one or more engine restart conditions being met, the controller may send a signal to the starter motor to crank the engine. Also, the controller may send a signal to the fuel injectors and spark plugs coupled to the engine cylinders to resume fueling and spark to each of the engine cylinders to stop combustion.

At 334, regeneration of an exhaust particulate filter (such as PF 72 in FIG. 2) may be scheduled based on the estimated upcoming torque demand. As particulate matter accumulates on the PF, the exhaust back pressure may increase which may negatively influence the engine performance. Once the PF reaches a threshold load, the PF may be periodically or opportunistically regenerated to reduce the particulate matter load and the corresponding exhaust back pressure. In order to regenerate (burn) the accumulated PF, a higher than a threshold exhaust temperature may be desired. A higher than threshold exhaust temperature may be achieved during a higher than a threshold torque demand (increased engine load conditions). Details of the scheduling of PF regeneration is discussed with reference to FIG. 4.

In this way, traffic conditions including a length of a line of vehicles directly ahead of a vehicle and road segment characteristics including gradient of road immediately ahead of the vehicle may be evaluated based on data received from a remote source, a duration of engine shut-down of the vehicle responsive to the evaluated traffic conditions and road segment characteristics may be estimated, one or more vehicle thresholds may be modified responsive to the estimated duration of engine shut-down, and responsive to the vehicle exceeding the one or more vehicle thresholds, an engine idle-stop may be initiated.

Figure 4:
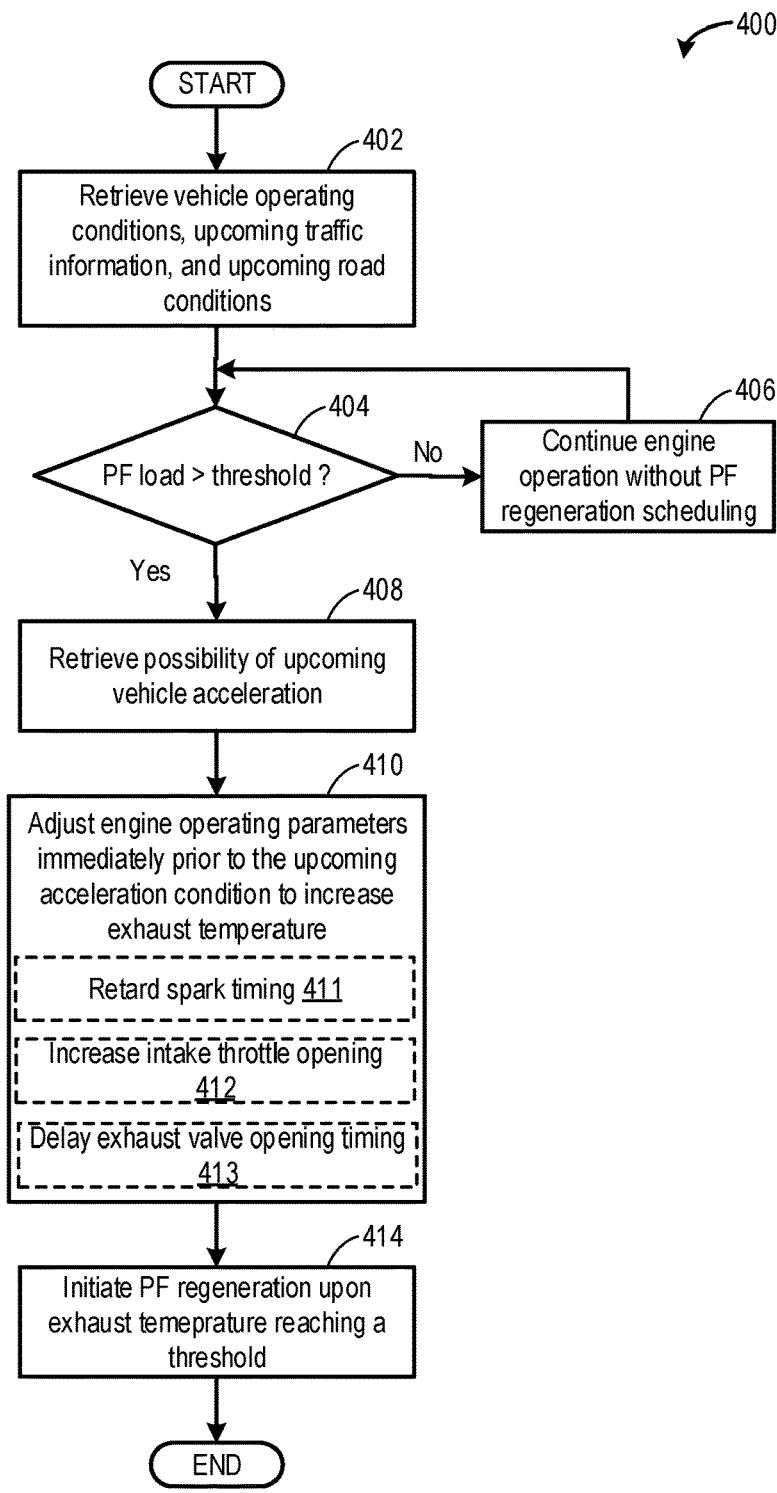
FIG. 4 is a flow chart illustrating an example method that may be implemented for scheduling regeneration of an exhaust particulate filter (PF).

FIG. 4 shows an example method 400 that may be implemented for scheduling regeneration of an exhaust particulate filter (PF) based on traffic and road conditions data received from remote sources. The example method 400 may be part of the example method 300 as discussed in FIG. 3 and the method 400 may be carried out at step 334 of method 300.

At 402, vehicle operating conditions as determined in step 302 of method 300, upcoming traffic information as determined in step 304 of method 300, and upcoming road conditions as determined in step 320 of method 300 may be retrieved from the controller memory.

At 404, the routine includes determining if the PF soot load is greater than a first threshold load. The PF load may be estimated based on the exhaust backpressure as estimated via a pressure sensor (such as the pressure sensor 76 in FIG. 2) coupled across the PF. The first threshold PF load may be calibrated as an upper threshold load or a threshold exhaust backpressure above which exhaust expulsion from cylinders may be adversely affected, negatively influencing engine performance. If it determined that the PF load is lower than the first threshold, at 406, engine operation with the current exhaust temperature may be maintained and the PF may not be regenerated.

If it is determined that the PF load is higher than the threshold load, it may be inferred that the PF is desired to be regenerated. The soot accumulated on the PF may be oxidized at the higher than threshold exhaust temperature when the engine is operated at leaner than stoichiometric air-fuel ratio conditions (increased oxygen in exhaust). Therefore, in order to regenerate the PF, the exhaust temperature is desired to be higher than a threshold temperature. The threshold temperature may be calibrated based on the thermal energy desired to burn the soot accumulated on the PF. During vehicle acceleration, there is an increase in engine load which causes a corresponding increase in engine thermal output, thereby increasing the exhaust temperature to above the threshold temperature.

At 408, the controller may retrieve a timeline for a possibility of upcoming vehicle acceleration as determined in step 323 based on the traffic information and the road conditions information as retrieved from the remote sources. Based on the timing of the upcoming vehicle acceleration condition, regeneration of the PF may be scheduled. PF regeneration may be carried out once the temperature of exhaust flowing through the PF reaches a threshold temperature.

Increased engine load during vehicle acceleration may increase the exhaust temperature, however, there may be a difference between the actual increased exhaust temperature and the threshold temperature. At 410, in order to increase the exhaust temperature to the threshold temperature, one or more engine operating parameters may be adjusted immediately prior to the upcoming acceleration condition.

Adjusting engine operating parameters includes, at 411, spark timing may be retarded to a first spark timing from maximum brake torque (MBT) timing. MBT timing may be determined based on the engine operating conditions as estimated in step 302. By retarding spark timing, combustion efficiency may be decreased thereby further increasing exhaust temperature. The amount of spark retard at the first spark timing may be based on difference between the exhaust temperature reached during the acceleration condition and the threshold exhaust temperature (as desired for PF regeneration). The amount of spark retard from MBT may be increased with an increase in the difference between exhaust temperature reached during the acceleration condition and the threshold exhaust temperature. In one example, the controller may determine the amount of spark retard at the first spark timing based on a calculation using a look-up table with the input being difference between the exhaust temperature reached during the acceleration condition and the threshold exhaust temperature and the output being the amount of spark retard from MBT.

Adjusting engine operating parameters also includes, at 412, increasing an opening of the intake throttle in order to increase combustion rate in the engine cylinders. The increased combustion in the cylinders may result in an increase in thermal output, thereby increasing exhaust temperature. The degree of opening of the intake throttle may be based on difference between the exhaust temperature reached during the acceleration condition and the threshold exhaust temperature (as desired for PF regeneration). The degree of opening of the intake throttle may be increased with an increase in the difference between exhaust temperature reached during the acceleration condition and the threshold exhaust temperature. In one example, the controller may determine the degree of opening of the intake throttle based on a calculation using a look-up table with the input being difference between the exhaust temperature reached during the acceleration condition and the threshold exhaust temperature and the output being the degree of opening of the intake throttle.

Adjusting engine operating parameters further includes, at 413, delaying the exhaust valve opening timing. By delaying the opening of the exhaust valve from present exhaust valve timing, a larger portion of hot exhaust residuals may be released from the engine cylinders, thereby increasing exhaust temperature. The amount of delay for exhaust valve opening may be based on a difference between the exhaust temperature reached during the acceleration condition and the threshold exhaust temperature (as desired for PF regeneration). The amount of delay for exhaust valve opening may be increased with an increase in the difference between exhaust temperature reached during the acceleration condition and the threshold exhaust temperature. In one example, the controller may determine the amount of delay for exhaust valve opening based on a calculation using a look-up table with the input being difference between the exhaust temperature reached during the acceleration condition and the threshold exhaust temperature and the output being the amount of delay for exhaust valve opening.

Once the exhaust temperature increases to above the threshold exhaust temperature, at 414, the controller may initiate PF regeneration. In one example, the PF regeneration may be initiated during a leaner than stoichiometric engine operation. In another example, the controller may initiate PF regeneration by actively enleaning the engine. During regeneration of the PF, the high temperature exhaust flowing through the PF may burn the soot accumulated on the filter. PF regeneration may be continued until the PF load reduces to below a second threshold load, the second threshold load lower than the first threshold load. Once the PF loading reduces to below a second threshold loading, it may be inferred that the PF regeneration is complete and exhaust temperature may no longer be desired to be maintained above the threshold temperature. In one example, upon completion of PF regeneration, the spark timing may be adjusted to the spark timing prior to the PF regeneration, the intake throttle opening may be adjusted to the throttle opening prior to the PF regeneration, and the exhaust valve timing may be adjusted to the timing prior to the PF regeneration. In another example, upon completion of PF regeneration, each of the spark timing, the intake throttle opening, and the exhaust valve timing may be adjusted based on current engine operating conditions.

In this way, upcoming torque demand may be estimated based on traffic conditions data and road characteristics data received from remote sources and regeneration of the particulate filter may be scheduled during a upcoming higher than threshold torque demand, the scheduling including retarding spark timing from maximum brake torque (MBT) to obtain a higher than threshold exhaust gas temperature and adjusting a pulse rate of fuel injection to the one or more cylinders to obtain a leaner than stoichiometric air fuel ratio.

FIG. 5 shows an example operating sequence 500 illustrating scheduling of engine idle-stops and exhaust particulate filter (PF) regeneration based on traffic information and road conditions data received from remote sources. The horizontal (x-axis) denotes time and the vertical markers t1-t7 identify significant times in the scheduling of each of the engine idle-stops and PF regeneration.

The first plot, line 502, shows variation in vehicle speed over time. Dashed line 503 shows a threshold vehicle speed below which an engine idle-stop may be initiated. The second plot, line 504, shows a position of an accelerator pedal. The third plot, line 506, shows engine speed. The fourth plot, line 508, shows presence of an obstacle such as equipment for road construction occupying one lane of a bi-lane road in a road segment directly ahead of the vehicle. The fifth plot line 510, shows a change in road gradient (slope) in the road segment directly ahead of the vehicle. Dashed line 511 denotes a threshold road gradient below which the vehicle may be propelled without engine torque. The sixth plot, line 512, shows exhaust temperature as estimated via an exhaust temperature sensor (such as exhaust temperature sensor 75 in FIG. 2) coupled to the exhaust passage. Dashed line 513 denotes a threshold exhaust temperature above which soot deposited on the PF may be burnt. The seventh plot, line 514, shows spark timing relative to maximum brake torque (MBT). The eighth plot, line 516, shows soot load accumulated on the PF as estimated via an exhaust pressure sensor (such as pressure sensor 76 in FIG. 2) coupled across the PF. Dashed line 515 denotes an upper threshold load above which the PF is to be regenerated and the dashed line 517 denotes a lower threshold load at which the generation may be discontinued. The ninth plot, line 518, shows an engine idle-stop.

Prior to time t1, the controller receives data including traffic information and road characteristics information for a road segment immediately ahead of the vehicle from one or more remote sources communicatively coupled to the vehicle. The remote sources include one or more of an external server, traffic cameras, on-board controller of one or more vehicles in a line of vehicles ahead of the vehicle (reference), and overhead drones. The traffic information includes length of the line of vehicles and relative movement within the line, characteristics including acceleration profiles of each of the vehicles in the line, cause for formation of the line of vehicles such as on-road obstructions, accidents, traffic signal, etc. The road characteristics information includes gradient (slope) of road immediately ahead of the vehicle and curvatures and turns in the road segment immediately ahead of the vehicle. During this time, the engine is combusting and spark timing is maintained at MBT.

Based on the road conditions data received from the remote sources, the controller determines that there is an obstacle present on the road ahead of the vehicle. Due to the presence of the obstacle, traffic congestion and a subsequent reduction of the vehicle speed to below the threshold speed 503 is estimated to happen at time t1. In one example, the threshold 503 may be calibrated based on energy efficiency benefits achieved from idle-stopping the engine responsive to the vehicle speed decreasing to below the threshold speed 503. Based on the traffic conditions data, the controller estimates a duration (S1) of a prospective idle-stop (duration of engine shut-down) if the engine is stopped at time t1 when the vehicle speed decreases to below the threshold speed 503. The duration S1 is compared to a threshold duration of engine idle-stop (D1). The threshold duration is calibrated based on fuel efficiency gained from the engine shut-down and electric motor power consumption for engine cranking during an immediate engine start following the shut-down.

In response to S1 being greater than D1, at time t1, the controller initiates an engine shut-down by suspending fueling and spark to the engine cylinders. Consequently, the engine speed reduces to zero. Due to the traffic congestion caused by the upcoming on-road obstacle, there is an accelerator pedal tip-out at time t1, causing an expected decrease in vehicle speed to below the threshold speed 503. Between time t1 and t2, the engine is maintained idle-stopped and the vehicle speed decreases. At time t2, due to the presence of the obstacle, there is a further accelerator pedal tip-out, causing the vehicle speed to decrease further. During the lower than threshold vehicle speed, between time t2 and t3, the engine is maintained idle-stopped with fueling and spark being disabled.

At time t3, once the vehicle crosses the on-road obstacle, the traffic congestion clears up and there is a tip-in of the accelerator pedal. In response to the increased torque demand (due to tip-in), controller sends a signal to the starter motor to crank the engine. Also, fueling and spark to the engine cylinders is resumed at time t3. Between time t3 and t4, each of the engine speed and the vehicle speed increase.

Based on the road conditions data received from the remote sources, between time t3 and t4, the controller determines that there is an upcoming decrease in gradient to below the threshold gradient 511 on the road ahead of the vehicle. The road gradient is estimated to be below the threshold 511 between time t4 and t5. In one example, the threshold gradient 511 may be estimated at time t3 based on vehicle operating conditions including torque demand and electrical accessory load. Due to the decrease in road gradient, the vehicle may be propelled without the supply of engine torque between time t4 and t5. Based on the road gradient data, the controller estimates a duration (S2) of a prospective idle-stop (as shown by dashed line 519) if the engine is stopped at time t4 when the road gradient decreases and then restarted at time t5 when the gradient increases to above the threshold 511 (thereby requesting increased engine torque). The duration S2 is compared to a threshold duration of engine idle-stop (D1). Based on the comparison, it is inferred that since S2 is lower than D1, engine idle-stop between time t4 and t5 is not beneficial for overall energy efficiency of the vehicle.

At time t4, due to the anticipated decrease in road gradient there is an accelerator pedal tip-out and consequently there is a decrease in engine speed. However, based on the road gradient data available from the remote sources, an engine idle-stop is not initiated, thereby decreasing engine idle-stops of lower than threshold D1 duration and increasing overall energy efficiency.

Between time t4 and t5, the soot load on the PF increases to above the upper threshold load 515 and regeneration of the PF is desired. In one example, upper threshold 515 may be calibrated prior to engine operation based on empirically determined back-pressures. Alternatively, upper threshold 515 may be calibrated during engine operation based on measured or modeled exhaust back-pressure. In order to regenerate the PF, the exhaust temperature is desired to be above the threshold temperature 513. In one example, the controller may calibrate the threshold temperature 513 based on an amount of thermal energy desired to burn the soot accumulated on the PF. Based on the road gradient data, the controller estimates an upcoming increase in torque demand between time t5 and t6. During the upcoming increase in torque demand, the thermal output of the engine may increase, thereby increasing the exhaust temperature to above the threshold 513. In this way, the controller may schedule PF regeneration during an upcoming period of increased torque demand.

At time t5, due to an increase in road gradient, there is an accelerator tip-in requesting increased engine torque. Between time t5 and t6, the engine speed increases and also there is an increase in the exhaust temperature. In order to further increase the exhaust temperature to above the threshold temperature 513, between time t5 and t6, spark is retarded from MBT. By retarded spark from MBT, combustion efficiency may be decreased thereby expediting the increase in exhaust temperature.

At time t6, as the exhaust temperature increases to above the threshold temperature 513, the soot load accumulated on the PF starts burning opportunistically. Between time t6 and t7, the PF is regenerated and the soot load on the PF progressively decreases. At time t7, it is observed that the PF load has reached the lower threshold 517 indicating that the PF regeneration is completed and it is no longer desired to maintain the exhaust temperature above the threshold temperature 513. In order reduce fuel penalty and improve engine efficiency, at t7, the spark timing is advanced towards MBT. As the PF regeneration is complete and the spark timing is restored to MBT, the exhaust temperature decreases to below the threshold 513. After time t7, with ongoing engine operation, soot accumulates on the PF.

FIG. 6 shows an example 600 of relative motion between each vehicle within a line of vehicles travelling on a road segment immediately ahead of the vehicle (also referred herein as the reference vehicle). The line of vehicles may be formed due to a traffic congestion caused by an obstruction on the road ahead of the reference vehicle and due to the traffic congestion, each of the vehicles in the line of vehicles may stop a plurality of times as it travels along the road segment. The horizontal (x-axis) denotes time and the vertical markers t1-t7 identify significant times in the movement of the line of vehicles.

The first plot, line 602, shows the speed of a first vehicle (vehicle 1) in the line of vehicles immediately ahead of the reference vehicle. The second plot, line 604, shows the speed of a second vehicle (vehicle 2) in the line of vehicles immediately ahead of the reference vehicle. The third plot, line 606, shows the speed of a third vehicle (vehicle 3) in the line of vehicles immediately ahead of the reference vehicle. The fourth plot, line 608, shows the speed of a fourth vehicle (vehicle 4) in the line of vehicles immediately ahead of the reference vehicle. The fifth plot, line 610, shows the speed of a fifth vehicle (vehicle 5) in the line of vehicles immediately ahead of the reference vehicle. The sixth plot, line 612, shows the speed of the reference vehicle. The seventh plot, line 614, shows an engine idle-stop for the reference vehicle. Within the line of vehicles, the distance between vehicle 1 and the reference vehicle is the longest while the distance between vehicle 5 and the reference vehicle is the shortest (reference vehicle is immediately behind vehicle 5 in the line). The on-board controller of the reference vehicle may be communicatively coupled to the on-board controllers of each of the vehicles (including vehicle 1, vehicle 2, vehicle 3, vehicle 4, and vehicle 5) in the line of vehicles immediately ahead of the reference vehicle and in a same lane as the reference vehicle.

At time t0, vehicle 1 starts moving from rest while the remaining vehicles in the line of vehicles remain stationary. Once vehicle 1 accelerates and gains a threshold speed, vehicle 2 starts moving from rest. In one example, the threshold speed may be calibrated based on an average distance between each vehicle in the line of vehicles. In this way, when a vehicle in the line of vehicles attains the threshold speed, a vehicle immediately behind the vehicle starts moving. Therefore, the reference vehicle remains stationary until vehicle 5 starts moving and attains the threshold speed. The time delay between beginning of motion of the first vehicle after the most recent stop and the beginning of motion of each intermediate vehicle after the most recent stop creates a wave-like, undulating pattern of movement in the line of vehicles. The controller may estimate the nature of the undulating movement such as the delay between the beginnings of motion for any two successive vehicles, the duration of motion of each vehicle before the immediately next stop, and a duration of stop for each vehicle between consecutive movements.

Based on traffic information including the number of vehicles in the line of vehicles ahead of the reference vehicle, the time at which the first vehicle starts moving, and the acceleration profiles (such as rate of change of speed within a duration) of each vehicle between the first vehicle and the reference vehicle as received from a remote source, the controller (of the reference vehicle) may estimate at time t0 that the reference vehicle may start moving at time t1. Based on the traffic information, the controller estimates a duration (T1) of a prospective idle-stop (duration of engine shut-down) if the engine is stopped between time t0 and t1. The duration T1 is compared to a threshold duration of engine idle-stop (D1). The threshold duration is calibrated based on fuel efficiency gained from the engine shut-down and electric motor power consumption for engine cranking during the engine start at time t1. Responsive to T1 being shorter than D1, an engine idle-stop is not initiated at time t0, thereby reducing the occurrence of idle-stops having shorter than threshold durations.

At time t1, as the reference vehicle starts to move, the controller estimates that the reference vehicle may stop at time t2 and then again restart at time t3. A duration (T2) of a prospective idle-stop (duration of engine shut-down) if the engine is stopped between time t2 and t3 may be estimated and compared to the threshold duration D1. Responsive to T2 being shorter than the threshold duration D1, an engine idle-stop is not initiated at time t2.

At time t3, each vehicle in the line of vehicles starts moving simultaneously, however, the acceleration profiles of each vehicle is different due to difference in the vehicle characteristics (such as vehicle weights, vehicle power rating, etc.). Between time t3 and t4 each vehicle in the line of vehicles remain in motion and then each of the vehicles come to a stop between time t4 and t5.

Based on the traffic information, the controller estimates that the reference vehicle may stop at time t5 and then restart at time t7. A duration (T3) of a prospective idle-stop if the engine is stopped between time t5 and t7 may be estimated and compared to the threshold duration D1. In response to T3 being longer than D1, an engine idle-stop may be initiated at time t4, when the vehicle decelerates before coming to a complete stop (vehicle speed zero) at time t5. The controller may send a signal to the fuel injectors coupled to the engine cylinders to suspend fueling to each of the engine cylinders to stop combustion. Also, in order to stop combustion, the controller may send a signal to the spark plugs coupled to the engine cylinders to deactivate spark. Engine shut-down (rolling stop-start) may be initiated during vehicle deceleration once the vehicle speed reduces to below a threshold speed. In one example, the threshold speed may be 10 MPH. By initiating engine shut-down at time t4 even before the vehicle stops completely, the duration of engine idle-stop may be increased, thereby increasing the energy efficiency achieved during the engine idle-stop.

Vehicle 1 starts moving at time t6 and each vehicle behind vehicle 1 subsequently starts moving between time t6 and t7 with different acceleration profiles. Due to the different acceleration profiles of each vehicle, the undulating movement of the line of vehicles after time t7 is different from each of the undulating movements as seen between time t0 and t2 and between time t3 and t4. As the reference vehicle starts moving at time t7, the engine is restarted. In order to restart the engine, the controller may send a signal to the starter motor to crank the engine. Also, the controller may send a signal to the fuel injectors coupled to the engine cylinders to resume fueling to each of the engine cylinders to initiate combustion. The controller may send a signal to the spark plugs coupled to the engine cylinders to activate spark. After time t7, based on the traffic information, the controller infers that there is no upcoming stop (due to traffic congestion) for any one of the vehicles in the line of vehicles and the engine continues to operate in order to propel the vehicle.

In this way, by estimating a duration of an upcoming prospective engine idle-stop based on traffic and road characteristics data obtained from a plurality of remote sources and by stopping the engine responsive to a higher than threshold estimated duration of the possible idle-stop, frequent engine idle-stops for shorter than threshold durations may be reduced. By adjusting one or more vehicle thresholds based on the traffic and road characteristics data, engine idle-stops may be optimized for increased fuel efficiency benefits. The technical effect of estimating the threshold duration of the engine idle-stop based on fuel efficiency gained from the engine shut-down and electric motor power consumption for engine cranking during an immediate engine start following the shut-down is that overall energy efficiency of the vehicle may be improved. By reducing repeated engine idle-stops of shorter than threshold durations, degradation of engine components may be lowered and perceivable changes to engine sound due to the frequent engine idle-stops may be reduced, thereby increasing overall operator satisfaction.

An example engine method comprises: receiving data indicative of external vehicle conditions to a vehicle including a length of a line of vehicles and relative movement within the line, adjusting vehicle operating thresholds responsive to the data, and selectively activating or deactivating an engine responsive to the thresholds and the data. In any preceding example, additionally or optionally, the length of the line of vehicles includes a number of vehicles stopping in a road ahead of the vehicle, wherein adjusting vehicle operating thresholds responsive to the data includes decreasing a threshold vehicle stopping time before the engine is deactivated as the number of vehicles stopping on the road ahead of the vehicle increases, and the vehicle including an on-board controller that is communicatively coupled to on-board controllers of one or more vehicles in the line of vehicles. In any or all of the preceding examples, additionally or optionally, adjusting vehicle operating thresholds responsive to the data further includes adjusting a threshold vehicle stopping time before the engine is deactivated based on each of a duration of vehicle movement before stopping and a duration of vehicle stop between successive movements, the adjusting including decreasing the threshold vehicle stopping time before the engine is deactivated as the duration of vehicle movement before stopping decreases and the duration of vehicle stop increases. In any or all of the preceding examples, additionally or optionally, the relative movement within the line includes a speed of a first vehicle stopped in the line of vehicles, the speed of each intermediate vehicle in the line of vehicles, delay times between beginning motion of the first vehicle after a most recent stop of the first vehicle and beginning motion or each intermediate vehicle after the most recent stop of the first vehicle, and a nature of undulating movement of the line of vehicles. In any or all of the preceding examples, additionally or optionally, the data includes characteristics of the one or more vehicles in the line of vehicles, the characteristics including weight or acceleration profiles of each of the one or more vehicles in the line of vehicles. In any or all of the preceding examples, additionally or optionally, the data further includes a cause for formation of the line of vehicles, the cause including one or more of a traffic light, a traffic stop sign, traffic stop due to road work, and traffic stop due to an accident. In any or all of the preceding examples, the method further comprises, additionally or optionally, estimating a duration of engine shut-down for the vehicle based on each of the length of the line of vehicles, relative movement within the line, the characteristics of the one or more vehicles in the line of vehicles, and the cause for formation of the line of vehicles. In any or all of the preceding examples, additionally or optionally, the selectively deactivating the engine responsive to the thresholds and the data include deactivating the engine by suspending fueling of the engine in response to one or more of the duration of engine shut-down for the vehicle being higher than a threshold duration, a vehicle stopping time being higher than the threshold vehicle stopping time, a state of charge of the electric motor battery being higher than a threshold state of charge of the electric motor battery and an electrical accessory load on the engine being lower than a threshold electrical accessory load on the engine. In any or all of the preceding examples, additionally or optionally, the adjusting vehicle operating thresholds responsive to the data is in response to the duration of engine shut-down for the vehicle being higher than the threshold duration, the adjusting including decreasing the threshold state of charge of an electric motor battery and increasing the threshold electrical accessory load. In any or all of the preceding examples, additionally or optionally, selectively activating the engine responsive to the thresholds and the data include maintaining fueling to the engine in response to one or more of the duration of engine shut-down for the vehicle being lower than the threshold duration, the vehicle stopping time being lower than the threshold vehicle stopping time, the state of charge of the electric motor battery being lower than the threshold state of charge of the electric motor battery and the electrical accessory load on the engine being higher than the threshold electrical accessory load on the engine. In any or all of the preceding examples, additionally or optionally, receiving data includes receiving data via a network from one or more of an external server, traffic cameras, on-board controller of the one or more vehicles in the line of vehicles, and overhead drones.

Another engine example method comprises: evaluating traffic conditions including a length of a line of vehicles directly ahead of a vehicle and road segment characteristics including gradient of road immediately ahead of the vehicle based on data received from a remote source, estimating a duration of engine shut-down of the vehicle responsive to the evaluated traffic conditions and road segment characteristics, modifying one or more vehicle thresholds responsive to the estimated duration of engine shut-down, and responsive to the vehicle exceeding the one or more vehicle thresholds, initiating an engine idle-stop. In any preceding example, additionally or optionally, the traffic conditions further include speed of a first vehicle in the line of vehicles, speed of a last vehicle in the line of vehicles, the speed of each intermediate vehicle in the line of vehicles, distance between the first vehicle and the last vehicle, obstacles ahead of the vehicle, and intersections ahead of the vehicle. In any or all of the preceding examples, additionally or optionally, the one or more vehicle thresholds include a duration of engine shut-down threshold, and a state of charge of an electric motor battery threshold, where an electric motor battery supplies energy for engine cranking immediately after the engine shut-down. In any or all of the preceding examples, additionally or optionally, the duration of engine shut-down threshold is based on fuel efficiency gained from the engine shut-down and electric motor power consumption for engine cranking during an immediate engine start following the shut-down. In any or all of the preceding examples, additionally or optionally, modifying the one or more vehicle thresholds responsive to the estimated duration of engine shut-down includes decreasing the threshold state of charge of the electric motor battery and increasing a threshold electrical accessory load responsive to the duration of engine shut-down being higher than a threshold, where an electrical accessory includes an air-conditioning system. In any or all of the preceding examples, the method further comprises, additionally or optionally, estimating upcoming torque demand based on road segment characteristics immediately ahead of the vehicle and traffic conditions, and initiating the engine idle-stop in response to a lower than threshold upcoming torque demand.

In yet another example, an electric machine including a battery, an engine including one or more cylinders, one or more fuel injectors and spark plugs coupled to the one or more cylinders, an engine exhaust passage including a particulate filter, a starter motor coupled to a crankshaft, an air-conditioning system, a navigation system configured to determine a geographical location of the vehicle, an on-board controller communicatively coupled to each of an off-board controller and a plurality of on-board controllers of vehicles travelling within a threshold radial distance, the on-board controller including computer-readable instructions stored on non-transitory memory for: during on-road vehicle travel, transmitting the geographical location of the vehicle to the off-board controller, receiving a first set of data including relative distance between vehicles travelling ahead of the vehicle and relative speed between the vehicles travelling ahead of the vehicle from the off-board controller and the on-board controllers of the vehicles travelling within the threshold radial distance, receiving a second set of data including road gradient and road curvature immediately ahead of the vehicle, estimating a duration of operation of the vehicle at a lower than threshold speed based on each of the first set of data and the second set of data, and adjusting fueling to the one or more cylinders based on the duration of operation of the vehicle at a lower than threshold speed. In any preceding example, additionally or optionally, adjusting fueling to the one or more cylinders include, during a higher than threshold duration of operation of the vehicle at a lower than threshold speed, responsive to the vehicle speed reaching the threshold speed, suspending fueling to the one or more cylinders. In any preceding example, additionally or optionally, the controller contains further instructions for: estimating upcoming torque demand based on each of the first set of data and the second set of data and scheduling regeneration of the particulate filter during a upcoming higher than threshold torque demand, the scheduling including regarding spark timing from maximum brake torque (MBT) to obtain a higher than threshold exhaust gas temperature and adjusting a pulse rate of fuel injection to the one or more cylinders to obtain a leaner than stoichiometric air fuel ratio.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid vehicle system, comprising:
an electric machine including a battery;
an engine including one or more cylinders;
one or more fuel injectors and spark plugs coupled to the one or more cylinders;
an engine exhaust passage including a particulate filter;
a starter motor coupled to a crankshaft;
an air-conditioning system;
a navigation system configured to determine a geographical location of a vehicle; and
an on-board controller communicatively coupled to each of an off-board controller and a plurality of on-board controllers of vehicles travelling within a threshold radial distance, the on-board controller including computer-readable instructions stored on non-transitory memory for:
during on-road vehicle travel,
transmitting the geographical location of the vehicle to the off-board controller;
receiving a first set of data including relative distance between vehicles travelling ahead of the vehicle and relative speed between the vehicles travelling ahead of the vehicle from the off-board controller and the on-board controllers of the vehicles travelling within the threshold radial distance;
receiving a second set of data including road gradient and road curvature immediately ahead of the vehicle;
estimating a duration of operation of the vehicle at a lower than threshold speed based on each of the first set of data and the second set of data; and
adjusting fueling to the one or more cylinders based on the duration of operation of the vehicle at the lower than threshold speed.

2. The system of claim 1, wherein adjusting fueling to the one or more cylinders includes, during a higher than threshold duration of operation of the vehicle at the lower than threshold speed, responsive to a vehicle speed reaching the threshold speed, suspending fueling to the one or more cylinders.

3. The system of claim 1, wherein the controller contains further instructions for:
estimating upcoming torque demand based on each of the first set of data and the second set of data and scheduling regeneration of the particulate filter during an upcoming higher than threshold torque demand, the scheduling including retarding spark timing from maximum brake torque (MBT) to obtain a higher than threshold exhaust gas temperature and adjusting a pulse rate of fuel injection to the one or more cylinders to obtain a leaner than stoichiometric air fuel ratio.

4. The system of claim 1, wherein the controller contains further instructions for adjusting vehicle operating thresholds responsive to the first set of data, comprising:
selectively activating or deactivating the engine responsive to the operating thresholds and the first set of data, and decreasing a threshold vehicle stopping time before the engine is deactivated as the number of vehicles stopping on the road ahead of the vehicle increases.

5. The system of claim 4, wherein adjusting vehicle operating thresholds responsive to the first set of data further includes adjusting the threshold vehicle stopping time before the engine is deactivated based on each of a duration of vehicle movement before stopping and a duration of vehicle stop between successive movements, the adjusting including decreasing the threshold vehicle stopping time before the engine is deactivated as the duration of vehicle movement before stopping decreases and the duration of vehicle stop increases.

6. The system of claim 5, wherein the first set of data includes characteristics of the one or more vehicles in the line of vehicles, the characteristics including weight or acceleration profiles of each of the one or more vehicles in the line of vehicles.

7. The system of claim 6, further comprising instructions for estimating a duration of engine shut-down for the vehicle based on each of the length of the line of vehicles, the vehicle movement relative within the line, the characteristics of the one or more vehicles in the line of vehicles, and a cause for formation of the line of vehicles.

8. The system of claim 7, wherein the selectively deactivating the engine responsive to the vehicle operating thresholds and the first set of data includes deactivating the engine by suspending fueling of the engine in response to one or more of the duration of engine shut-down for the vehicle being higher than a threshold duration, a vehicle stopping time being higher than the threshold vehicle stopping time, a state of charge of the electric motor battery being higher than a threshold state of charge of the electric motor battery, and an electrical accessory load on the engine being lower than a threshold electrical accessory load on the engine.

9. The system of claim 8, wherein the adjusting the vehicle operating thresholds responsive to the first set of data is in response to the duration of engine shut-down for the vehicle being higher than the threshold duration, the adjusting including decreasing the threshold state of charge of the electric motor battery, and increasing the threshold electrical accessory load.

10. The system of claim 8, wherein selectively activating the engine responsive to the vehicle operating thresholds and the first set of data includes maintaining fueling to the engine in response to one or more of the duration of engine shut-down for the vehicle being lower than the threshold duration, the vehicle stopping time being lower than the threshold vehicle stopping time, the state of charge of the electric motor battery being lower than the threshold state of charge of the electric motor battery, and the electrical accessory load on the engine being higher than the threshold electrical accessory load on the engine.

11. The system of claim 4, wherein the first set of data includes a speed of a first vehicle stopped in a line of vehicles, a speed of each of an intermediate vehicle in the line of vehicles, delay times between beginning motion of the first vehicle after a most recent stop of the first vehicle and beginning motion of each intermediate vehicle after the most recent stop of the first vehicle, and a nature of undulating movement of the line of vehicles.

12. The system of claim 1, wherein the first set of data further includes a cause for formation of the line of vehicles, the cause including one or more of a traffic light, a traffic stop sign, a traffic stop due to road work, and a traffic stop due to an accident.

13. The system of claim 1, wherein receiving the first set of data includes receiving the first set of data via a network from one or more of an external server, traffic cameras, an on-board controller of the one or more vehicles in the line of vehicles, and overhead drones.

* * * * *